United States Patent [19]

Smith

[11] Patent Number: 5,286,771
[45] Date of Patent: Feb. 15, 1994

[54] ETHYLENE/ACID COPOLYMERS WITH IMPROVED BLOCK RESISTANCE

[75] Inventor: Malcolm S. Smith, Beaumont, Tex.

[73] Assignee: E. I. Du Pont de Nemours and Company, Wilmington, Del.

[21] Appl. No.: 881,962

[22] Filed: May 12, 1992

[51] Int. Cl.$^5$ .............................................. C08K 3/08
[52] U.S. Cl. ..................... 524/78; 524/229; 524/314; 524/432; 524/433
[58] Field of Search ............... 524/229, 314, 78, 229, 524/314, 432, 433

[56] References Cited

U.S. PATENT DOCUMENTS

| | | | |
|---|---|---|---|
| Re. 32,325 | 1/1987 | Smith | 524/229 |
| 3,892,834 | 7/1975 | Pritchard | 264/142 |
| 4,264,554 | 4/1981 | Hale et al. | 264/142 |
| 4,663,383 | 5/1987 | Lowe et al. | 524/493 |

FOREIGN PATENT DOCUMENTS

| | | |
|---|---|---|
| 58-131638 | 7/1983 | Japan . |
| 60-023449 | 2/1985 | Japan . |

*Primary Examiner*—Joseph L. Schofer
*Assistant Examiner*—Jeffrey T. Smith
*Attorney, Agent, or Firm*—Peter A. Fowell; Craig H. Evans

[57] ABSTRACT

The block resistance of pellets of copolymers of ethylene with acrylic or methacrylic acid is improved by addition of very low levels of certain defined liquid additives or water-soluble solid additives. This results in improved rates of pellet production, and in easier subsequent handling.

7 Claims, No Drawings

ETHYLENE/ACID COPOLYMERS WITH IMPROVED BLOCK RESISTANCE

BACKGROUND OF THE INVENTION

1. Field of the Invention

This invention relates to pellets of copolymers of ethylene and an ethylenically unsaturated carboxylic acid, which have been surface-coated with a low level of certain liquid additives or water-soluble solid additives. The treated pellets have permanently increased block resistance which leads to improved pellet production rates and handling characteristics. Many of these additives are acceptable for food contact, allowing use of films made from copolymer pellets surface-coated with these additives in food packaging.

2. Description of Related Art

Ethylene copolymer pellets have an increasing tendency to 'block', that is to say clump together, at ambient or slightly elevated temperatures as the level of comonomer increases. However, different comonomers affect properties of ethylene copolymers containing them, including the tendency to block, to a differing extent for the same comonomer level, both on a weight and mole basis. There appears to be more than one cause of blocking. Thus, for instance, softness or flexibility which can be a significant causative factor for some copolymers to block, is not as important for other copolymers. In any event, when stick temperature, a measure of pellet blocking, is below 30° C., resultant poor pellet handling characteristics during manufacture can affect production rates. This is partly because certain production operations such as monomer 'purging' of polymer pellets, which uses hot air, become more efficient at higher temperatures. Increasing blocking during long storage can also become a significant problem for polymer processors.

Pellets of copolymers of ethylene with acrylic and methacrylic acid and certain ionomers derived from these copolymers are particularly prone to blocking. A common way of reducing blocking is by use of certain anti-blocking additives. However, these acid copolymers and their ionomers are used extensively in the food packaging industry, and when so used, the polymer must be acceptable to the FDA.

Many anti-blocking additives for ethylene copolymers, are known, but they may not all function in the same way. They may also be effective at quite different levels. Some additives are effective for many copolymers. Thus, U.S. Pat. No. Re. 32,325 (Smith) discloses use of certain solid bisamides to reduce blocking in a wide variety of ethylene copolymers, including ethylene/methacrylic acid copolymers as well as ethylene/vinyl acetate polymers and several other ethylene copolymers. The additive is incorporated while the polymer is molten, and must migrate to the surface of pellets to be effective. Rather high levels, preferably 2000–4000 ppm are required. These bisamides have limited FDA acceptability.

Other additives appear to be more specific to a given copolymer. U.S. Pat. No. 4,663,383 (Lowe et al.) discloses use of silica particles surface-coated on pellets at 50 ppm or more to reduce blocking. Polymers with no acid group are described as not showing significant improvement with such treatment. This additive may be added to solid dry pellets of the copolymer, or during cutting of the extruded polymer strand into pellets by mixing the additive with the melt cutter water. Since the additive is added to the surface, it is not required to migrate to the surface. While some forms of silica are acceptable for food contact use, silica has been found to cause equipment wear in polymer processing equipment. In addition, after mechanical handling of silica-coated pellets, the effectiveness of the silica in reducing blocking diminishes. Its ability to prevent blocking is thus not completely permanent.

U.S. Pat. No. 4,264,554 (Hale) discloses use of surfactants including ethylene oxide and propylene oxide homo and copolymers, preferably copolymers. The surfactants are added to water containing the pellets to reduce agglomeration of the pellets while they are in water, as they are when in the melt cutting water immediately after pelletization. Ethylene/vinyl acetate/methacrylic acid copolymers are mentioned. There is no indication these additives would prevent blocking of dry pellets.

In packaging applications, heat-sealability is a critical property. A useful additive to decrease blocking should not significantly affect the level of heat-sealability. Yet additives which reduce blocking at elevated temperatures can reduce heat-sealability. Silicone oil for instance, though an effective additive for increasing stick temperature, is known to adversely affect heat-sealability even at low levels.

Mechanical treatment, particularly some form of roughening of pellet surfaces also affects blocking. However, attempts to achieve surface modification in a controlled way has not been successful. In addition, such operations are time consuming, and could not be conveniently carried out at a stage in pellet production before which pellet blocking becomes a problem.

There is a need for an additive which will have FDA acceptability for use in contact with food, which can be readily surface-coated on polymer pellets to produce a permanent reduction in their blocking tendency, and which does not adversely affect heat-sealability or other utility of the polymer in a significant manner.

SUMMARY OF THE INVENTION

The present invention provides for ethylene/acid copolymer pellets, having a low level of surface-coated liquid additive or water-soluble solid additive which increases the stick temperature to above about 30° C.

According to the present invention, there are provided pellets of a direct ethylene copolymer comprising repeat units derived at least 50 wt. % from ethylene, 8–30 wt. % from acrylic or methacrylic acid, and optionally up to 40 wt. % from an alkyl acrylate or vinyl acetate, from 0–80 percent of the acid groups in the copolymer being neutralized with metal ions selected from the group consisting of zinc, magnesium and calcium, surface-coated with an effective amount, between about 5 and 1000 ppm, of a liquid additive or water-soluble solid additive to raise the stick temperature of said pellets to above about 30° C., the additive having a boiling point at atmospheric pressure of above about 220° C. and being selected from the group consisting of (i) monohydric and polyhydric aliphatic alcohols, (ii) aliphatic acid esters or fatty acid esters of (i), (iii) homopolymers and copolymers of 2–5 carbon alkylene oxides of average molecular weight from about 200 to about 5000, (iv) ethers, aliphatic acid esters or fatty acid esters of (iii), (v) low molecular weight liquid polyester plasticizers and (vi) mineral oil, vegetable oils and animal oils.

DETAILED DESCRIPTION OF THE INVENTION

In this disclosure, the word copolymer is used to embrace polymers with two or more monomers. If a distinction is necessary, the words 'bipolymer', 'terpolymer' etc are used. The phrase 'direct copolymer' describes a copolymer made by polymerizing monomers together directly, rather than by adding a polymer chain onto an existing one by grafting on its monomer.

Different monomers, when copolymerized with ethylene using high pressure free radical polymerization reduce crystallinity and melting point to less than that of comparably polymerized polyethylene homopolymer. The reduction is to a large extent dependent on the molar amount of comonomer. Other property changes such as glass-transition temperature (the temperature at which a polymer becomes rubbery) and stiffness strongly depend on the particular comonomer type as well as the amount of comonomer. A monomer which deforms a high glass-transition temperature homopolymer such as methacrylic acid may increase stiffness and glass-transition temperature of the derived copolymer, while monomers which form low glass-transition temperature homopolymers such as vinyl acetate or some alkyl acrylates, do the opposite. For this reason the latter monomers have been referred as a 'softening' monomers. High glass-transition temperature monomers can thus have apposing effects when copolymerized with ethylene. They reduce crystallinity and the stiffness which results from crystallinity, yet they also increase stiffness due to their effect on glassiness. Often there may be a minimum in the stiffness/comonomer level relation. Certain surface properties of copolymers, such as the tendency to build up static charge may also be comonomer specific. Reduced crystallinity increases softness and flexibility that is to say reduce modulus or stiffness. Changes in melting point and glass-transition temperature also affect stiffness as a function of temperature. Many of these changes influence the blocking tendency of polymers. The net result is that ethylene copolymers containing different comonomers behave differently in their blocking tendency per se and with respect to temperature.

U.S. Pat. No. RE 32,325 states that for ethylene/vinyl acetate copolymers, as the vinyl acetate content increases the copolymer tends to become increasingly 'sticky' and at the same time pellets increasingly tend to block. Blocking becomes severe above 35 wt. % vinyl acetate. This might suggest that blocking tendency is merely a function of softness or stickiness of a polymer. However, the situation appears to be far more complex. Thus at low comonomer levels, reduced crystallinity makes ethylene copolymers softer or less stiff than comparably made polyethylene, but as comonomer level increases, while vinyl acetate copolymers continue to become softer, methacrylic acid copolymers start to become stiffer again. Yet despite increasing stiffness, blocking increases rather than decreases with increasing levels of methacrylic acid. Thus factors other than softness appear to be involved. It is likely that different anti-blocking additives operate by a different mechanism, or alternatively are required to interfere with a different block-causing mechanism, or both.

Ethylene copolymer pellets can block or clump together during various stages of production. In the typical production of polymer pellets, an extruded strand is cut into pellets in a water bath, then, after removal of excess water, screened to remove 'fines' and excessively large pellets. The pellets are then conveyed to a blender, where blending helps counter any non-uniformity. 'Purging' with hot air for removal of remaining monomer also is carried out in the blender. This is followed by drying, packaging and storage.

Clumping is potentially a problem at all stages after strandcutting for very soft polymers such as ethylene/vinyl acetate with more than 25% vinyl acetate, and for such polymer anti-blocking additives are best added to the molten polymer before cutting. For polymers, such as the ethylene/(meth)acrylic acid polymers relevant to this invention, the problem first becomes acute only in the hot-air purging of monomer from the polymer. It is thus possible to add anti-blocking additives after the cutting operation.

One way of quantifying the blocking tendency of a copolymer is to measure its stick temperature, which is a measure of the temperature where blocking becomes significant. This is described below, and is also described in U.S. Pat. No. 4,663,383 which is herein incorporated by reference. While stick temperature is not a perfect guide to how much a polymer will block at ambient temperatures, it is particularly useful as a guide to blocking in elevated temperature operations such as purging.

While it would be advantageous to increase stick temperature of ethylene copolymers significantly, say to 70° C. or more, additives which are known to produce such increases, such as silica, have various deficiencies as noted above. Other additives may cause a significant increase in stick temperature but are unacceptable in other regards such as food contact and affect on heat-sealability. Thus, many very effective block-reducing agents are unacceptable for a variety of other reasons.

It has become apparent however that for polymers with a very low stick temperature, below about 30° C., even a small increase to above about 30° C. can be highly desirable for many of the operations involved in the production handling and storage of polymer pellets.

The ethylene copolymers of particular relevance in the present invention are those containing acrylic and methacrylic acid as comonomer, as well as certain derived ionomers. The acid copolymers have low stick temperatures even at quite low comonomer levels. Above 7 weight percent acid stick temperature can be below 30° C. Polymers with more than 30 weight percent acid are not normally made for reasons related to the polymerization itself. The invention is particularly applicable to polymers containing from 15-25 weight percent acid. While the invention is of particular relevance with respect to simple copolymers of only ethylene and acid comonomer, other monomers can be present. These include alkyl acrylates or methacrylates and vinyl acetate. They may be present up to about 40 weight percent. Ethylene/acid copolymers neutralized with certain metal ions to form ionomers are also encompassed by this invention. Up to 80% of the acid groups may be neutralized. Neutralization also affects stick temperature though different ions have a different effect. Zinc ionomers, are softer and more flexible than most other ionomers and are particularly prone to blocking. Calcium and Magnesium ionomers also tend to block, but Sodium ionomers have much higher stick temperatures, and are generally not a problem. Lithium ionomers are of less concern, since they are not used in food contact use.

Ethylene/vinyl acetate copolymers are not encompassed by this invention. Ethylene/vinyl acetate copolymers can be very soft, even considerably softer than acid copolymers contemplated in this invention. Yet despite a high level of comonomer, measurement of stick temperature of a typical grade of this polymer, 'Elvax' 150, manufactured by E. I. du Pont de Nemours and Company Inc., containing 33 weight percent vinyl acetate, gave a value of 36° C. Also, addition of a typical additive contemplated in this invention, CARBOWAX 400, a polyethylene glycol manufactured by Union Carbide Corporation, did not increase the stick temperature. It is believed that when the stick temperature is above about 35° C. the additives of this invention have no effect.

Other factors which have an effect on stick temperature of cut pellets are surface roughness, pellet dimensions, shape which may be affected by the particular type of cutter, and 'history'. When a pellet surface is very smooth and/or flat, sticking will increase due to the likelihood of increased contact area. When the surface is roughened somewhat, stick temperature may increase. However, any roughness which tends to cause mechanical interlocking will decrease stick temperature. Pellets obtained on the shaker (sizing) screen immediately after pelletization have a smooth surface and also have a low block resistance, possibly due to the high pellet to pellet contact possible.

During the production of polymer pellets, in the various blending, screening and conveying operations, pellets are subject to various degrees of surface modification, abrading, roughening and even smoothing. Generally it is found that there is an increase in stick temperature after these 'handling' processes. Stick temperature increases of as much as 10° C. have been obtained with some ethylene copolymers. However such methods of roughening which occur inherently during production occur too late in the production to be of utility. Deliberate roughening also can only be readily accomplished at a stage where blocking may already have caused handling problems. Attempts to roughen the pellets in a controlled manner by passing them over a very rough surface have not produced a reliable increase in stick temperature, but rather, a decrease due to excess roughness which results in mechanical interlocking. In addition, attempts to roughen may be accompanied by generation of very small polymer particles or 'fines', which is disadvantageous in polymer processing.

Mere 'aging', that is to say just allowing pellets to stand around, can affect stick temperature also. This may be due to changes in surface crystallinity or other surface changes. This effect seems to vary from polymer to polymer. Thus non-neutralized acid copolymers pellets, fresh from the shaker screen do not appear to change significantly in stick temperature. Sodium and zinc ionomers however have been found to increase in stick temperature on aging. Because such pellet 'history' and 'aging' can affect stick temperature however, it is important in evaluating potential non-blocking additives to compare stick temperature of coated pellets to that of pellets with similar aging and history. Pellets used in testing were generally taken direct from the shaker screen, and tested immediately to avoid these variable effects.

The pellets may be of the normal size encompassed by the term pellet. A broad range might be 0.4–18 g/100 pellets. Normal pellets range from 1–5 g/100 pellets, usually 2–4 g/100 pellets. This was the size used in testing this invention. Pellets size does not have an important effect on the invention. Smaller pellets can be cooled more quickly than large pellets, but they tend to block more readily, but that is a feature inherent to pellets, and not directly related to the invention.

The liquid additives or water-soluble solid additives suitable for use in this invention must be sufficiently non-volatile to remain on the pellet surface during drying of the pellets after the melt cutting operation, which typically uses a water quench bath. For this reason, they should have a boiling point above about 220° C.

While some additives affect heat-sealability of films made from the additive modified polymer, even at low additive levels, far more affect heat-sealability when a relatively high level is needed to reduce blocking. For this reason generally those additives which are effective at very low levels are preferred, and low levels of those effective additives are also preferred.

Surprisingly it has now been found that certain liquid additives or water-soluble solid additives exist, which when surface coated on specific ethylene copolymer pellets, even at very low levels, impart a significant improvement in block resistance. These additives can be divided into two alternative categories; water-soluble (liquid or solid) and non water-soluble (liquid). For the purposes of this invention, water-soluble means soluble to an extent greater than about 1 gram/liter at room temperature.

The first and preferred category comprises those which are soluble in water. Water solubility has the advantage of greater application versatility. Thus, aqueous solutions can be applied to the pellet as a mist. Or the additive can be added to the melt-cutter quench water, though this is not the preferred method. Water provides an environmentally acceptable solvent-carrier for application of the additive. In addition, quite viscous additives can be handled by using an aqueous solution. The availability of water as a solvent-carrier makes control of the level of additive simpler, since very low levels are of most interest in this invention, and a dilute solution can provide more uniform surface coatings and well as more accurate metering.

The other category comprises non water-soluble liquid additives. These can also be applied, undiluted, as a mist only if the additive is low enough in viscosity. Alternatively, the liquid can be added directly in the blender. In either case, with no solvent-carrier, control of the amount added becomes more difficult. A mist of an emulsion or dispersion of the additive in water however may be possible.

Application of the additive on a commercial scale is preferably done using a spray of the additive on the pellets after the cutting operation, after removal from the cutting water.

Amounts as low as 5 ppm are effective for some additives. Above about 400 ppm there is generally little additional advantage. Above about 1000 ppm the stick temperature may actually decrease as the amount of additive on the pellet surface acts to restrict pellet movement. Above about 1000 ppm also, there will be an increasing tendency to affect heat-sealability, and above 3000 ppm the effect may be severe even with additives which are not particularly prone to affect heat-sealability. The preferred level of additive is between 10 and 400 ppm and most preferred is between 25 and 300 ppm.

Liquid additives or water-soluble solid additives which are effective in reducing blocking, (though not necessarily acceptable from a food contact standpoint), at the low levels required in this invention are, further surprisingly, amazingly chemically and physically diverse. Polyethylene oxides, which are water-soluble, and polypropylene oxides which are not, are both effective. Other polyakylene oxides are also effective as are ethers and esters of polyalkylene oxides. A typical example is polyethylene glycol monolaurate. Simple glycols such as ethylene glycol and propylene glycol are not effective, (though in any case they are too volative) yet glycerol (glycerine) is moderately effective. Effective additives may be quite low in viscosity or quite high. CARBOWAX 400, a polyethylene oxide with a viscosity of 90 cps. at room temperature is extremely effective, yet trisnonyl phenyl phosphite with a viscosity of 8900 cps. is also effective (although not acceptable for food contact). Aliphatic esters of aliphatic acids or aliphatic fatty acids such as methyl monooleate, glycerol monooleate and sorbitol monooleate are effective. Many vegetable oils are fatty acid esters. For example, soybean oil which is a mixture of triglycerides of oleic, linoleic and other acids is effective. Certain animal oils such as fish oil have also been found to be effective. For the most part the additives which are effective contain ether and/or ester and/or alcohol groups, yet mineral oil which is a hydrocarbon is somewhat effective.

Many polyalkylene oxides are also effective. Many of these are well known materials of commerce. Suitable additives for use in this invention have the general formula:

$$R_1-[-O(R_2O-)_nH]_m$$

wherein $R_1$ is hydrogen a linear or branched aliphatic cycloaliphatic, or alkoxy alkyl radical of 1 to 14 carbon atoms, $R_2$ is a linear or branched aliphatic hydrocarbon radical of 2 to 5 carbon atoms, n is an integer of from 1 to 200 and m is an integer of 1 to 3, and wherein the oligomer has an average molecular weight of from about 200 to 5,000. Molecular weights of from 200 to 1000 are preferred. When n is 1 and $R_1$ is hydrogen, the materials are often referred to as polyglycols, such as polyethylene glycol or polypropylene glycol. Many polyalkylene oxides are liquids and are not soluble in water. Polyethylene oxide is water-soluble, and is a liquid up to a molecular weight of about 600, above which it becomes a crystalline solid. When n is one and $R_1$ is not hydrogen, they may be referred to as glycol ethers, as for example polyethylene glycol methyl ether.

The material is 'star-branched' when m=3. Such materials are those initiated by a low molecular weight polyol such as trimethylolpropane. $R_2$ IS $CH_2CH_2$- for polyethylene oxide, and $R_2$ is $CH_2(CH_3)CH$- for polypropylene oxide. The materials may be esterified by an aliphatic or fatty acid. Molecular weights below 1000 are preferred.

Low and moderate molecular weight aliphatic alcohols and polyols are also suitable. Suitable additives exclude the more volatile ones boiling at below 220° C. such as ethylene glycol and propylene glycol, which, in any case, as noted above, were found to be non-effective. Of course, as the molecular weight of alcohols increases, they are decreasingly water-soluble. Polyols, however can have higher molecular weight and be water-soluble. Examples are trimethylolpropane, pentaerythritol. Solubility of course is a function of the relative number of hydroxyl groups and hydrocarbon groups.

Low molecular weight liquid polyesters of the type commercially available for polymer plasticization are also effective. A listing of such polyester plasticizers is given in the Modern Plastics Encyclopedia. Of the many available, simple trial and error will quickly determine the most suitable.

One other type of liquid additive has also surprisingly been found effective. This is mineral oil of various grades. They are not as effective in general as the oxygenated liquid or water-soluble solids, but nevertheless have been found effective.

Because the effectiveness of acceptable additives varies somewhat, it will be understood that the level required to give a specific increase in stick temperature will vary somewhat. However, it is a simple matter to determine the amount of a given additive, i.e. the effective amount, required to produce a particular increase in stick temperature. All of the additives suitable for use in the present invention are effective at levels below 200 ppm, and many are effective at very much lower levels.

From a purely commercial standpoint, the number of additives acceptable for food packaging is considerably fewer than the number which is effective per se. Of course acceptability in this regard will be different in different countries, for different particular uses and so on. Typical guidelines for use in the United States, for instance, are given in Title 21. C.F.R. relating to food and drugs.

On a laboratory scale, for testing, two methods of additive addition were used. In the first, the additive was added directly to the pellets, either as an aqueous solution, or undiluted. The method of addition and time of mixing was chosen to give a uniform and controllable amount of pellet-pellet interaction, since any such interaction can change stick temperature as discussed above. The method is as follows: 250 g. of polymer pellets taken directly from the shaker screen, unless otherwise indicated, are place in a one quart paint can. The required amount of additive is then added using a 1 ml. syringe, either undiluted or as an aqueous solution. The lid is then put on and the can rolled at 1250 rpm for 1 minute. The amount of additive indicated in the examples below is based on the assumption that all the additive remains on the polymer pellets. In the case of aqueous solutions, it is assumed that on drying, no additive is lost, only water evaporated. It will be recognized that there will be a small error in that, while the largest surface is that of the polymer cubes, a small amount will remain on the inner surface of the can. For water-soluble additives, while the additives of this invention are low in volatility, small amounts could volatize with the evaporation of the water. When an aqueous solution was used, concentrations in water were from 10 to 50 weight percent though much lower concentrations are possible.

The second laboratory scale method of testing was designed to simulate and evaluate introduction of additive into the melt-cutter water. In this method, 250 g. of pellets were added to water containing 2, 5 or 10 weight percent additive. The only additive evaluated was CARBOWAX 400 since the purpose, in this case, was to evaluate a potentially commercial mode of addition rather than the additive per se. The pellets were stirred for 15 seconds, poured on to a screen to remove excess water, spread out and allowed to dry overnight at room temperature prior to running stick temperature measurements.

Increase in stick temperature of the polymer is the chief measure of the effectiveness of the invention. The stick temperature is defined as the maximum temperature at which all the polymer pellets empty from the test apparatus in less than one minute following holdup under fixed conditions. To measure the stick temperature, polymer pellets are place in a vertical tube having inside diameter of 3.9 cm. and length 23.2 cm. lined loosely with a 5-mil thick film of MYLAR polyethylene terephthalate. A 4086 g weight is placed on top of the pellets so that the downward pressure is 33.5 kPa. Hot air is passed upward through the pellets at 23.4 L cm$^3$/min for 15 min. followed by air at ambient temperature for 5 minutes. The weight is then removed and the tube is inverted. Time during which all the pellets flow out of the tube is noted. The test is repeated at gradually increasing temperatures until a point is reached when only a portion of the copolymer pellets or none of the pellets flow out of the tube. The stick temperature is the last temperature at which all the pellets flowed out in less than one minute.

EXAMPLES

Stick temperature of Polymers without additive

As a basis for comparison, the stick temperature of the polymers of relevance in this invention were determined. The designations P1 etc. C1 etc. refer to the particular polymer in its particular condition of history and aging. The conditions may be for example C1 taken directly after screening, or C2 after tumbling in a blender for 2 hours.

TABLE 1

(Stick temperature of control polymers used)

| CONTROL EXAMPLE # | POLYMER/ CONDITION | STICK TEMP °C. |
|---|---|---|
| 1C | P1C1 | <24 |
| 2C | P1C2 | 28 |
| 3C | P1C3 | <24 |
| 4C | P2C3 | 23 |
| 5C | P3C1 | 30 |
| 6C | P4C1 | 32 |
| 7C | P5C1 | <24 |
| 8C | P6C1 | 24 |
| 9C | P7C1 | 29 |
| 10C | P8C4 | <24 |
| 11C | P9C1 | 36 |
| 12C | P10C1 | 31 |
| 13C | P11C1 | 34 |

P1 Ethylene/Methacrylic acid 85/15 (wt.) MI60
P2 Ethylene/Methacrylic acid 85/15 (wt.) MI25
P3 Ethylene/Methacrylic acid 91/9 (wt.) MI10
P4 Ethylene/Methacrylic acid 91/9 (wt.) MI3
P5 Ethylene/Methacrylic acid 88/12 (wt.) MI13.5
P6 Ethylene/Methacrylic acid 85/15 (wt.) 22% Zinc neutralized, MI14 (Ionomer).
P7 Ethylene/Methacrylic acid 91/9 (wt.) 18% Zinc neutralized, MI5 (Ionomer)
P8 Ethylene/Methacrylic acid 80/20 (wt.) MI60
P9 Ethylene/Vinyl acetate 67/33 (wt.), MI38–48
P10 Ethylene/n-Butyl acrylate/Methacrylic acid 67/24/9 (wt.)
P11 Ethylene/Methacrylic acid 80/20 (wt.) 46% Na neutralized, MI1.0
C1 From Shaker Screen
C2 Blender tumbled at room temp, 2 hrs.
C3 From Shaker Screen, rolled in can 1 minute
C4 Direct from Cylindrical Melt Cutter MI is melt index measured using ASTM D1238 condition E (2190 g, 190° C.)

There is no measurable difference in stick temperature of pellets taken direct from the shaker screen and pellets rolled in a can for one minute (conditions C1 and C3). The stick temperature test, which is currently conducted without refrigeration is only capable of measuring stick temperature down to about room temperature. Hence values are quoted as <24° C. Stick temperatures of samples for these two conditions, if below 24° C., could be different, but they are not measurable in the test. All resins used were tested to confirm this. There is however a slightly greater increase on tossing in a blender for 2 hours.

It can be seen also that stick temperature is relatively high for lower levels of methacrylic acid. Melt index is also seen to have some effect. Also, ionomerization by neutralization with zinc ion does not have a major effect on stick temperature, the dominant effect being the amount of acid.

Stick temperature of Polymers with Additives

In the following examples the additive and amount is shown. All addition was done using the first laboratory method except for example 12. Stick temperature for some polymers without additives is shown in Table 1. The examples are shown in Table 2.

TABLE 2

Stick temperature of Polymers with Additives

| Ex # | Polymer/ Cond. | Amount | Additive | Stick Temp C. |
|---|---|---|---|---|
| 1 | P1C3 | 200 ppm | CARBOWAX 400 | 35 |
| 2 | P1C3 | 50 ppm | CARBOWAX 400 | 35 |
| 3 | P1C3 | 25 ppm | CARBOWAX 400 | 33 |
| 4 | P1C3 | 10 ppm | CARBOWAX 400 | 30 |
| 5 | P1C3 | 200 ppm | Glycol Ester | 34.5 |
| 6 | P1C1 | 10 ppm | Glycol Ester | 31 |
| 7 | P1C3 | 200 ppm | ATMER 105 | 32 |
| 8 | P1C3 | 100 ppm | ATMOS 300 | 33 |
| 9 | P1C3 | 100 ppm | GLYCOLUBE 100 | 34 |
| 10 | P1C3 | 50 ppm | GLYCOLUBE 100 | 30 |
| 11 | P1C3 | 100 ppm | PLASTHALL P643 | 32 |
| 12 | P1C1 | 50 ppm | CARBOWAX 400(1) | 33 |
| 13 | P2C1 | 25 ppm | CARBOWAX 400 | 34 |
| 14 | P2C3 | 100 ppm | CARBOWAX 550 | 34 |
| 15 | P2C3 | 25 ppm | CARBOWAX 600 | 32.5 |
| 16 | P2C3 | 100 ppm | TEGMER 804 | 32 |
| 17 | P8C4 | 200 ppm | Mineral Oil | 33 |
| 18 | P6C1 | 100 ppm | Glycol Ester | 37 |
| 19 | P6C1 | 200 ppm | Glycerine | 34 |
| 20 | P10C3 | 400 ppm | CARBOWAX 400 | 36 |
| 21 | P8C3 | 50 ppm | PPG725 | 35 |
| 22 (compar) | P9C1 | 200 ppm | CARBOWAX 400 | 36 |
| 23 (compar) | P8C4 | 250 ppm | Silica | 51 |
| 24 (compar) | P8C4 | 250 ppm | Silicone Oil | 40 |
| 25 (compar) | P8C3 | 200 ppm | Ethylene Glycol | 29 |
| 26 (compar) | P8C3 | 200 ppm | Propylene Glycol | 29 |

CARBOWAX 400: Polyethylene oxide M Wt. 400 Mfg by U. Carbide.
Glycol Ester is Polyethylene oxide M Wt. 400 monolaurate Mfg. by C.P. Hall
ATMER 105 is sorbitan monooleate mfg. by ICI. America.
ATMOS 300 is a glycerol ester of edible oils mfg. by Humko
GLYCOLUBE 100 is glycerol monooleate mfg. by Lonza Corp.
PLASTHALL P643 is a low molecular weight polyester mfg. by C.P. Hall.
PPG725 Polypropylene Glycol M Wt. 725
(1) Applied from a 10/90 solution of C400/water, with water evaporated, according to second lab. scale method. TEGMER 804 is a polytetramethylene glycol of Mol. Wt ~800 mfg. by C.P. Hall.

The data show that many compounds increase the stick temperature of ethylene/acid copolymers and ionomers to above 30° C. In the case of ethylene/vinyl acetate, with 33 weight percent vinyl acetate, the stick temperature of 'unaged' polymer is 36° C. and is unaffected by additives of this invention. However, terpolymers containing ethylene, n-butyl acrylate and methacrylic acid have a low stick temperature, and these polymers increase in stick temperature with addition of the additives of this invention.

I claim:

1. Pellets of a direct ethylene copolymer comprising repeat units derived
   a) at least 50 wt. % from ethylene,
   b) 8-30 wt. % from acrylic or methacrylic acid and
   c) up to 40 wt. % from an alkyl acrylate or vinyl acetate, with from 0-80% of the acid groups neutralized with metal ions selected from the group consisting of zinc, magnesium and calcium, surface-coated with an effective amount, between about 5 and 1000 ppm, of a liquid additive or water-soluble solid additive to raise the stick temperature of said pellets to above about 30° C., the additive having a boiling point at atmospheric pressure above about 220° C., the additive being selected from the group consisting of:

(i) monohydric and polyhydric aliphatic alcohols,
   (ii) aliphatic acid esters or fatty acid esters of (i),
   (iii) homopolymers and copolymers of 2-5 carbon alkylene oxides of average molecular weight from about 200 to about 5000;
   (iv) ethers, aliphatic acid esters of fatty acid esters of (iii);
   (v) low molecular weight liquid polyesters plasticizers, and
   (vi) mineral oil, vegetable oils and animal oils.

2. The pellets of claim 1 wherein the surface-coating additive is water-soluble.

3. The pellets of claim 1 wherein the surface-coating additive is polyethylene oxide, polypropylene oxide or aliphatic acid esters of polyethylene oxide or polypropylene oxide.

4. The pellets of claim 3 wherein the direct ethylene copolymer comprises repeat units derived
   a) 70-90 wt. % from ethylene and
   b) 10-30 wt. % from acrylic or methacylic acid.

5. The pellets of claim 4 wherein the acid groups of the direct ethylene copolymer are 10-70 wt. % neutralized with zinc.

6. The pellets of claim 4 wherein the surface coating additive is polyethylene oxide having an average molecular weight of from 200 to 1000.

7. The pellets of claim 5 wherein the surface coating additive is polyethylene oxide having an average molecular weight of from 200 to 1000.

* * * * *